(12) United States Patent
Hong et al.

(10) Patent No.: US 9,995,481 B2
(45) Date of Patent: Jun. 12, 2018

(54) METHOD AND APPARATUS FOR A DUAL MODE BURNER YIELDING LOW NOX EMISSION

(71) Applicant: Eclipse, inc., Rockford, IL (US)

(72) Inventors: Jianhui Hong, Rockton, IL (US); Valeriy Smirnov, Loves Park, IL (US)

(73) Assignee: Eclipse, Inc., Rockford, IL (US)

( * ) Notice: Subject to any disclaimer, the term of this patent is extended or adjusted under 35 U.S.C. 154(b) by 1293 days.

(21) Appl. No.: 13/722,489

(22) Filed: Dec. 20, 2012

(65) Prior Publication Data

US 2013/0157204 A1 Jun. 20, 2013

Related U.S. Application Data

(60) Provisional application No. 61/577,776, filed on Dec. 20, 2011.

(51) Int. Cl.
  *F23D 14/64* (2006.01)
  *F23C 3/00* (2006.01)
  *F23D 14/66* (2006.01)

(52) U.S. Cl.
  CPC ............. *F23D 14/64* (2013.01); *F23C 3/002* (2013.01); *F23D 14/66* (2013.01); *F23C 2900/03005* (2013.01); *F23C 2900/99001* (2013.01); *Y02E 20/342* (2013.01); *Y02E 20/348* (2013.01)

(58) Field of Classification Search
  None
  See application file for complete search history.

(56) References Cited

U.S. PATENT DOCUMENTS

| 1,533,639 | A | | 4/1925 | Ehn |
| 3,294,599 | A | | 12/1966 | Huseby |
| 3,490,230 | A | * | 1/1970 | Suter .................. F23R 3/26 |
| | | | | 431/352 |
| 3,730,668 | A | | 5/1973 | Iida et al. |
| 3,782,705 | A | | 1/1974 | Westeren et al. |
| 4,115,190 | A | | 9/1978 | Clarke |
| 4,140,067 | A | | 2/1979 | Jensen |
| 4,171,126 | A | | 10/1979 | Zahn et al. |
| 4,189,294 | A | | 2/1980 | Rice et al. |

(Continued)

FOREIGN PATENT DOCUMENTS

| DE | 1994034 U | 9/1968 |
| DE | 3422229 A1 | 12/1985 |

(Continued)

OTHER PUBLICATIONS

Wünning et al., "Flameless Oxidation to Reduce Thermal NO-Formation," *Prog. Energy Combust. Sci.*, 23: 81-94 (1997).

*Primary Examiner* — Gregory Huson
*Assistant Examiner* — Martha Becton
(74) *Attorney, Agent, or Firm* — Brooks, Cameron & Huebsch, PLLC

(57) ABSTRACT

A method and apparatus for a burner adapted to heat a furnace or other environment of use. In particular, a burner for providing a fuel gas in combination with an oxidant to effect controlled reaction of the fuel gas in a manner to reduce NOx emissions is described. Combustion of the fuel gas is shifted from the burner combustor to a location outside the burner once the temperature within the furnace/radiant tube has reached a sufficient level to complete combustion of the fuel gas.

19 Claims, 7 Drawing Sheets

(56) References Cited

U.S. PATENT DOCUMENTS

| | | |
|---|---|---|
| 4,392,818 A | 7/1983 | Wünning |
| 4,583,936 A | 4/1986 | Krieger |
| 4,586,894 A | 5/1986 | Wünning |
| 4,596,610 A | 6/1986 | Kühn |
| 4,634,103 A | 1/1987 | Schmetz et al. |
| 4,653,732 A | 3/1987 | Wunning et al. |
| 4,867,808 A | 9/1989 | Heilmann et al. |
| 4,877,396 A | 10/1989 | Wunning |
| 4,906,182 A | 3/1990 | Moller |
| 4,945,841 A | 8/1990 | Nakamachi et al. |
| 5,076,344 A | 12/1991 | Fields et al. |
| 5,154,599 A | 10/1992 | Wunning |
| 5,165,884 A | 11/1992 | Martin et al. |
| 5,344,310 A | 9/1994 | Harbeck et al. |
| 5,379,683 A | 1/1995 | Ejiri et al. |
| 5,443,040 A | 8/1995 | Kaji et al. |
| 5,460,515 A * | 10/1995 | Harbeck .................. F23C 3/00 431/263 |
| 5,484,279 A | 1/1996 | Vonasek |
| 5,513,981 A | 5/1996 | Harbeck et al. |
| 5,520,534 A | 5/1996 | Nakagawa et al. |
| 5,533,890 A | 7/1996 | Holst et al. |
| 5,570,679 A | 11/1996 | Wunning |
| 5,635,139 A | 6/1997 | Holst et al. |
| 5,647,739 A * | 7/1997 | McDonald ............. F23C 6/045 431/10 |
| 5,779,465 A | 7/1998 | Clarke et al. |
| 5,967,113 A | 10/1999 | Kaneko et al. |
| 5,989,010 A | 11/1999 | Martin et al. |
| 6,033,208 A | 3/2000 | Wunning |
| 6,126,913 A | 10/2000 | Martin et al. |
| 6,293,275 B1 | 9/2001 | Wünning |
| 6,330,825 B1 | 12/2001 | Harness et al. |
| 6,652,265 B2 | 11/2003 | Cain |
| 6,824,383 B2 | 11/2004 | Cain |
| 6,969,250 B1 | 11/2005 | Kawamura et al. |
| 7,029,271 B2 | 4/2006 | Wunning et al. |
| 7,062,917 B2 | 6/2006 | Wunning et al. |
| 7,282,171 B2 | 10/2007 | Gross |
| 7,363,756 B2 | 4/2008 | Carrea et al. |
| 2011/0027734 A1 | 2/2011 | Hartwick et al. |
| 2011/0203771 A1 | 8/2011 | Goodson et al. |

FOREIGN PATENT DOCUMENTS

| | | |
|---|---|---|
| DE | 19650973 A1 | 6/1997 |
| EP | 0343746 A2 | 11/1989 |
| EP | 0463218 A1 | 1/1992 |
| EP | 1258278 A2 | 11/2002 |
| EP | 1893915 B1 | 8/2011 |
| WO | WO 01/07833 A1 | 2/2001 |
| WO | WO 2006/133880 A1 | 12/2006 |
| WO | WO 2009/047260 A2 | 4/2009 |

* cited by examiner

METHOD AND APPARATUS FOR A DUAL MODE BURNER YIELDING LOW NOX EMISSION

CROSS-REFERENCE TO RELATED APPLICATION

This patent application claims the benefit of U.S. Provisional Patent Application No. 61/577,776, filed Dec. 20, 2011, which is incorporated by reference.

BACKGROUND

The use of high velocity gas burners is well known. In such burners, fuel gas and oxidant are mixed with one another and ignited in the interior of the burner. The resultant hot combustion gases then flow at high velocity through an outlet and into the furnace chamber for direct heating or into a radiant tube for indirect heating. The combustion of the fuel gas with an oxidant within the burner results in a greatly elevated temperature environment in the burner. To increase system efficiency, the oxidant can be pre-heated to result in higher temperatures. The preheating of the oxidant may be achieved by using a recuperative or regenerative system that uses the residual heat in the exhaust gas. This high temperature combustion environment provides two challenges. First, the burner internals and combustion chamber are exposed to the very high temperature environment. Second, when combustion is carried out at extremely high temperatures, thermal nitrogen oxides (NOx) formation is promoted. As combustion temperatures increase, the levels of NOx production also increase. In order to deal with higher combustion temperatures, burners may be constructed from high temperature grade materials, for example, the combustion chambers can be made of ceramic materials which can withstand the high temperature environment. However, the difficulties associated with high NOx emissions still remain.

SUMMARY

A method and apparatus for a burner adapted to heat a furnace, radiant tube, or other environment of use is described herein. In particular, a burner for providing a fuel gas in combination with an oxidant to effect controlled combustion (or oxidation) of the fuel gas in a manner to reduce NOx emissions is described. Combustion of the fuel gas is shifted from within the burner combustor to a location outside the burner once the temperature within the furnace/radiant tube has reached a sufficient level to complete combustion of the fuel gas.

One embodiment provides a burner that uses staged introduction of a fuel gas in combination with oxidant to effect a controlled combustion (or oxidation) of the fuel gas in a manner to reduce NOx emissions. More particularly, the present invention provides a burner in which fuel gas may be delivered along a supply line to a nozzle device for axial and/or radial discharge into a burner combustor for mixing with oxidant at a ratio that provides a combustible mixture to sustain the flame in the burner combustor. During a start-up stage, the fuel gas/oxidant mixture is ignited with a spark igniter to combust within the burner combustor. During that period, the flame inside the burner combustor can be monitored with a flame sensor, such as a flame rod or UV scanner.

Once the temperature in the furnace/radiant tube reaches a pre-defined level above the auto-ignition temperature, the flow of both fuel gas and oxidant can be gradually increased. During this time, the flame gradually moves from the burner combustor towards the furnace chamber/radiant tube. When the total flow of fuel gas and oxidant exceeds a measurable threshold, which is dependent on the characteristics of the burner, the flame will no longer be present in the burner combustor and all combustion will take place in the furnace chamber/radiant tube. At that time, the flame sensor will detect a loss of flame inside the combustor. The flame will not return to the burner combustor so long as the exit velocity of the combustible fuel gas/oxidant is greater than the flame speed, and so long as there is not an ignition source within the burner combustor to reignite the mixture. Due to the elevated temperature above the auto ignition level in the furnace/radiant tube, this movement of the flame to the furnace/radiant tube space leads to combustion in the furnace/radiant tube in the absence of a flame in the burner. While the temperature levels within the furnace/radiant tube are sufficient to cause combustion of the fuel gas, these temperature levels nonetheless are low enough to avoid substantial NOx generation. Moreover, the high exit velocity of the air and fuel provides substantial blending and recirculation of the furnace/radiant tube atmosphere with the air/fuel mix, resulting in reduced spikes of temperatures in the furnace/radiant tube, which are normally experienced during the standard operating mode of typical burners. After the flame ceases to exist in the burner combustor, the flow rate of the mixture of fuel gas and oxidant can be maintained, decreased, or increased, according to the needs of the furnace operator. The burner will begin to cool after the flame has ceased to exist in the burner combustor, and, thus, when the burner has cooled to a temperature below the auto-combustion temperature, the flow rate of the mixture of fuel gas and oxidant can be decreased without the flame returning to the burner combustor.

Figure 1:
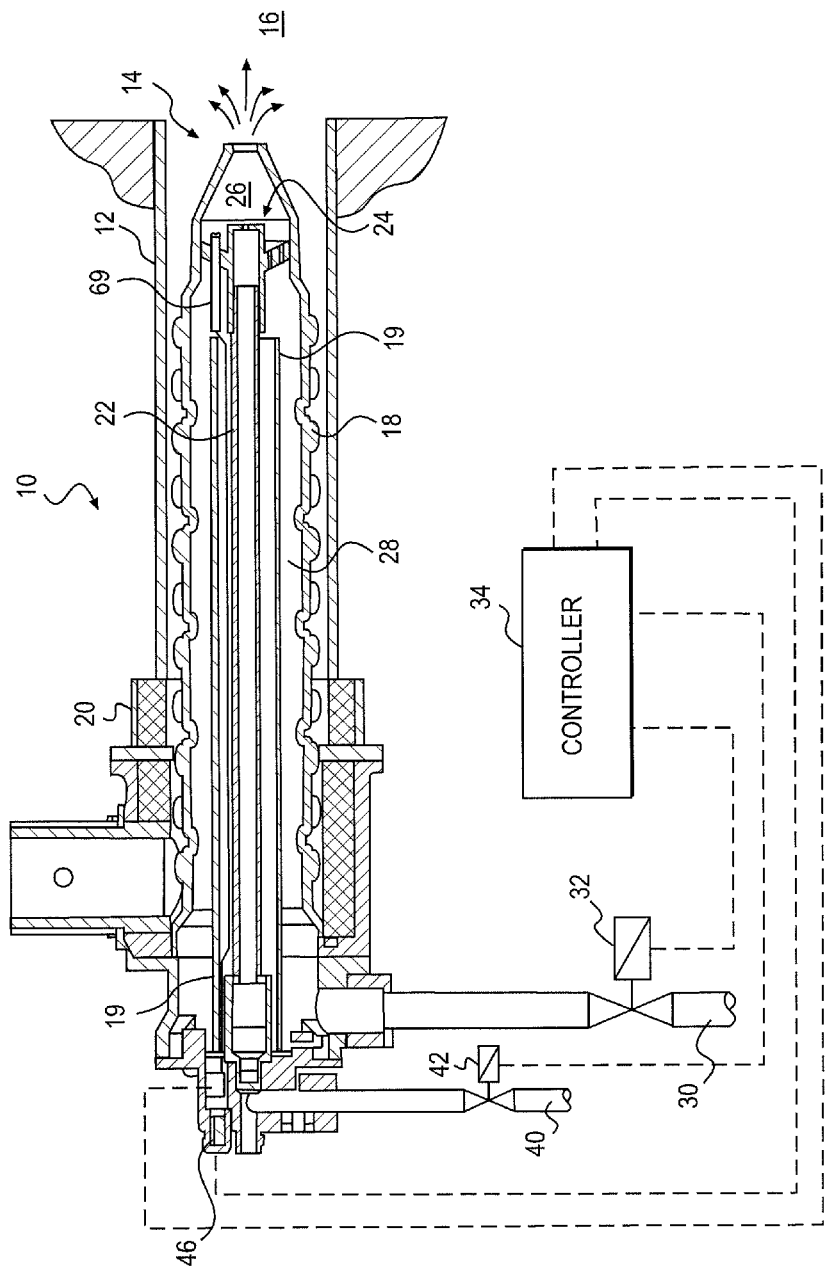
FIG. 1 is a diagrammatic view illustrating a burner and control system for staged delivery of fuel gas and combustion air adapted to heat a furnace, radiant tube, or other chamber.

Before the embodiments of the burner and method are explained in detail, it is to be understood that the invention is not limited in its application to the details of construction and/or the arrangements of the components set forth in the following description or illustrated in the drawings. Rather, the invention is capable of other embodiments and of being practiced or carried out in various ways. Also, it is to be understood that the phraseology and terminology used herein are for purposes of description only and should not be regarded as limiting. The use herein of "including", "comprising", and variations thereof is meant to encompass the items listed thereafter and equivalents, as well as additional items and equivalents thereof.

DETAILED DESCRIPTION

Reference will now be made to the drawings wherein like elements are designated by like reference numbers in the various views. FIG. 1 illustrates a burner 10 including a generally hollow tubular cover tube 12 having an open end 14 that projects into a furnace/radiant tube 16 or other environment to be heated. By way of example only, the burner 10 may project into an enclosed radiant heating tube or the like as will be well known to those of skill in the art and which is used for indirect heating of a furnace 16 while avoiding substantial introduction of combustion products into the furnace 16. As another example, the burner 10 may project into a furnace 16 for direct heating of the furnace 16 with substantial introduction of combustion products into the furnace 16. In the illustrated embodiment, the cover tube 12 is disposed in surrounding relation to a hollow heat recuperator 18 of ceramic or the like having a convoluted surface extending outwardly from a housing 20. The recuperator 18 can surround an air shroud 19 which, in turn, can surround a fuel tube 22 feeding a nozzle assembly 24 within a burner combustion chamber 26 (also referred to as a combustor) located adjacent to the open end of the burner. An annular air passageway 28 can be disposed between the outer walls of the air shroud 19 and the interior of the heat recuperator 18.

As shown, an air supply 30 provides combustion air for delivery from a blower or other supply source (not shown) to the annular air passageway 28 for transmittal to the nozzle assembly 24. An oxidant control valve 32 is used to control the flow of oxidant. In this regard, the oxidant control valve 32 may be operatively connected to a controller 34 such as a PLC, computer, or the like which opens or closes the oxidant control valve 32 in accordance with pre-established commands based on conditions in the furnace/radiant tube and/or the burner. Likewise, a fuel supply 40 provides natural gas or other gaseous fuel for delivery to the fuel tube 22 for transmittal to the nozzle assembly 24. A fuel control valve 42 is used to control the flow of fuel gas. In this regard, the fuel control valve 42 may be operatively connected to the controller 34 which adjusts fuel feed in accordance with pre-established commands based on conditions in the furnace, radiant tube, and/or the burner.

In accordance with one embodiment, a sensor 46 such as a thermocouple, flame sensor, or the like may be present to continuously monitor the temperature of the nozzle assembly or the presence of a flame and to communicate such data to the controller 34. As will be described further herein, the controller 34 may utilize the data from the sensor 46 in combination with temperature data from the furnace/radiant tube to control the delivery of fuel and/or oxidant to the burner according to a desired flow rate. It will be appreciated that the sensor 46 can be any suitable sensor and can be disposed in any suitable location.

Figure 2:
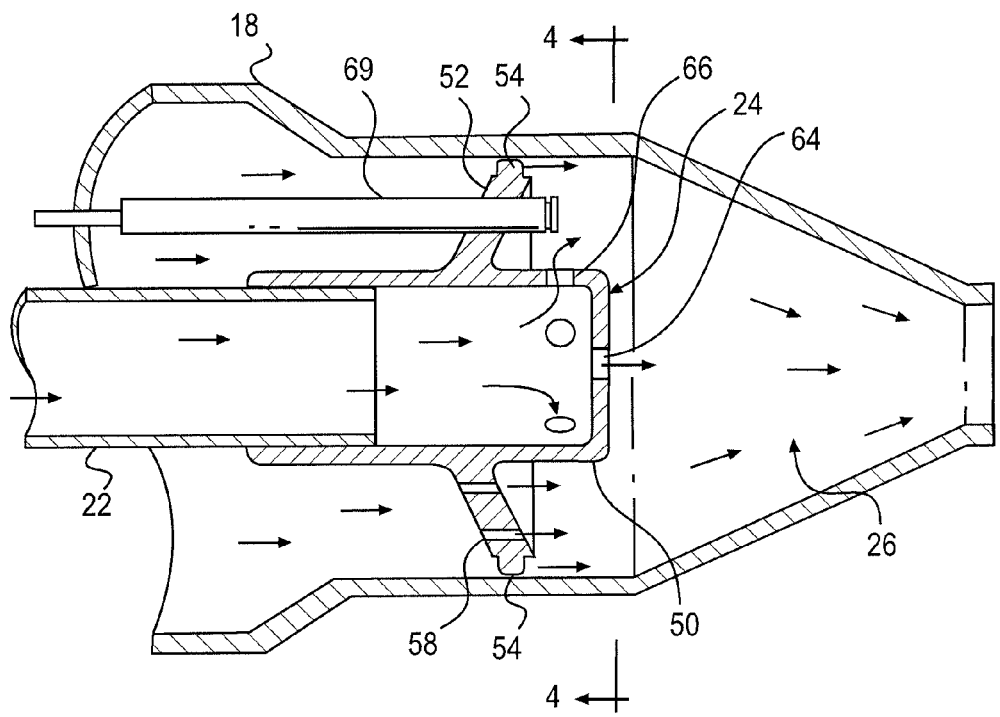
FIG. 2 is a fragmentary sectional view of a fuel gas discharge nozzle mounted within a combustor for the burner of FIG. 1.
Figure 3:
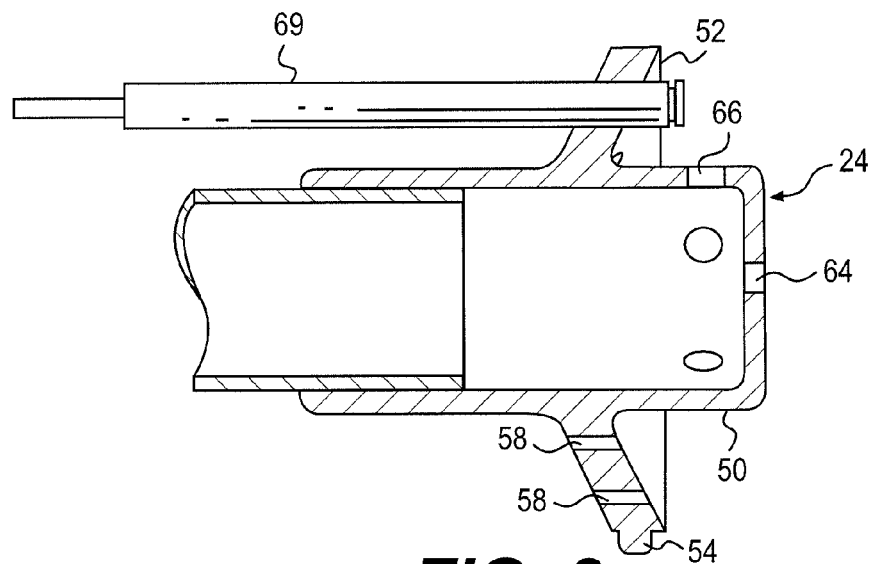
FIG. 3 is a fragmentary sectional view of the fuel gas discharge nozzle of FIG. 2 taken along line 3-3 in FIG. 4.
Figure 4:
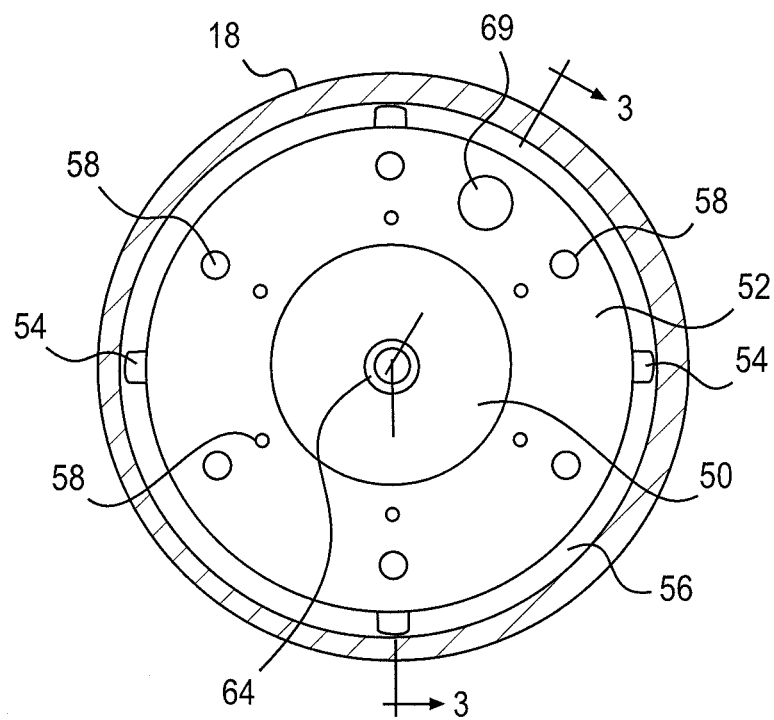
FIG. 4 is a sectional view taken generally along line 4-4 of FIG. 2 showing the orientation of an air flow control disk surrounding the fuel gas discharge nozzle of FIG. 2.

Referring now to FIGS. 2-4, the nozzle assembly 24 can be in the form of a sleeve that is secured about the distal end of the fuel tube 22. In this regard, the illustrated nozzle assembly 24 includes a forward nipple portion 50 and a radial disk portion 52 disposed rearward (i.e., upstream) of the nipple portion 50. In this arrangement, the radial disk portion 52 can have any suitable shape. In some embodiments, the radial disk portion 52 can be planar. In other embodiments, the radial disk portion 52 can have a generally concave forward face projecting towards the outlet of the burner.

As best seen through joint reference to FIGS. 2 and 4, stand-offs 54 can be located at positions around the circumference of the radial disk portion 52 to provide centered spacing relative to the surrounding body. This can result in an annular gap 56 extending substantially around the perimeter of the radial disk portion 52. The radial disk portion 52 also includes a pattern of interior air passages 58. As will be described further herein, during operation, oxidant delivered from the air supply 30 may flow through the annular gap 56 and the interior air passages 58 towards the burner outlet as shown by the arrows in FIG. 2.

As shown in FIG. 3, the forward nipple portion 50 can include an axial gas passage opening 64 and an arrangement of radial gas passage openings 66 aligned with corresponding openings in the fuel tube 22 for outward conveyance of the fuel gas. During operation fuel gas can be passed outwardly from the axial gas passage opening 64 and the radial gas passage openings 66 and can mix with the oxidant. It will be appreciated, however, that the fuel gas and oxidant can pass the nozzle assembly in any suitable manner and at any suitable angle.

As mentioned, the burner 10 may be operated in a flame mode with ignition within the burner combustor or in a flameless mode during which the oxidant and fuel gas combusts only downstream of the combustor outlet. The flameless mode may also be referred to as a volume combustion mode, i.e., when combustion is occurring in the volume of the furnace chamber or radiant tube in the absence of a flame in the burner. The flame mode provides the initial start-up of the furnace/radiant tube 16 using combustion of fuel gas in the burner combustion chamber 26 to heat up the furnace/radiant tube. The flame mode can be followed by the flameless mode during which the fuel gas and oxidant are ejected from the burner 10 and are allowed to undergo combustion downstream of the combustor outlet. This dual mode operation results in substantially reduced NOx emissions.

Figure 5:
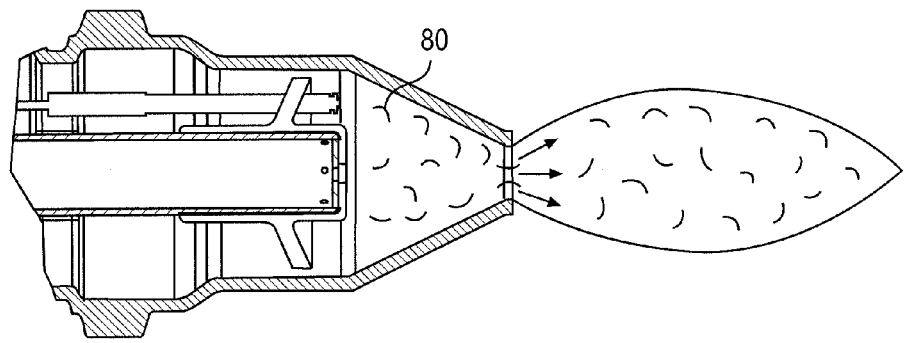
FIG. 5 is a simplified view showing the burner of FIG. 1 operating in a flame mode.

Referring again to FIGS. 1-4, by way of example only, and not limitation, upon initiation of the flame mode, both the air control valve 32 and the fuel control valve 42 are set to a partially open condition. In this partially open condition, oxidant will pass along the annular air passageway 28 to the nozzle assembly 24 and fuel gas will pass along the fuel tube 22 to the nozzle assembly 24. At the nozzle assembly 24, a portion of the oxidant can flow through the annular gap 56 surrounding the radial disk portion 52, while the remainder of the oxidant can pass through the interior air passages 58. Concurrently, the fuel gas can be expelled from the axial gas passage opening 64 and the radial gas passage openings 66 to mix with the oxidant in the burner combustion chamber 26. An electric spark rod 69 or the like can be activated by the controller 34 to ignite the fuel/air mixture in the burner combustion chamber 26. This ignition results in combustion occurring in the burner represented by lines 80, and a flame being present in the burner as shown in FIG. 5. This flame can be steadily maintained until the auto-ignition temperature in the furnace/radiant tube is achieved. Throughout the flame mode, thermocouples or other devices can continuously monitor the interior temperature of the furnace/radiant tube 16 and a flame sensor 46 can monitor the presence or absence of a flame inside the burner combustor 26 to provide such data to the controller 34 by means of any suitable link.

Figure 6:
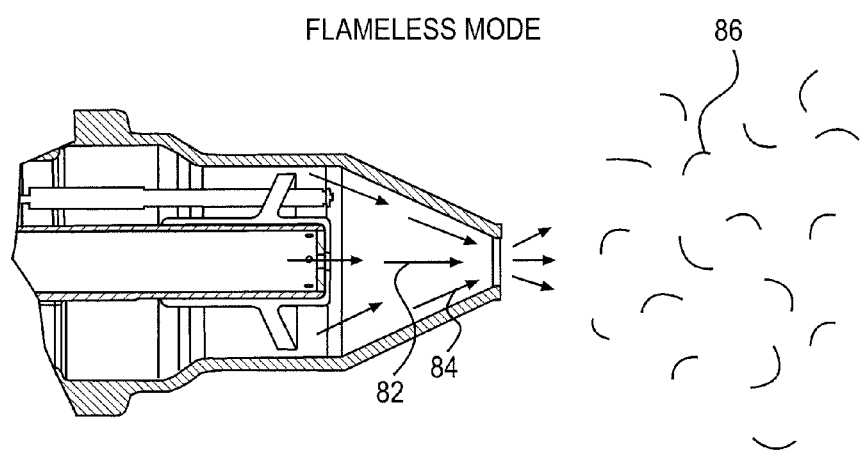
FIG. 6 is a simplified view showing the burner of FIG. 1 operating in a flameless mode.

Referring to FIG. 1, once the temperature within the furnace/radiant tube reaches a pre-established level (normally about 1550° Fahrenheit or greater) the controller 34 can further open the fuel control valve 42 to increase the flow of fuel gas through the fuel tube 22, and at about the same time, the oxidant control valve 32 can be opened by the controller 34 to increase the flow of oxidant. Both valves 32, 42 can be opened in a manner such that the oxidant/fuel ratio is maintained within combustible limits. For example, the ratio can be maintained slightly above the stoichiometric supply of air for the fuel flow to maintain about 2-3% oxygen in the exhaust. The increasing velocity of the fuel gas 82 and oxidant 84 pushes the flame away from the burner 10 into the furnace/radiant tube 16 until combustion, represented by lines 86, is only occurring in the furnace/radiant tube 16 and the flameless mode of the burner 10 has been reached as shown in FIG. 6. The movement of the flame away from the burner 10 can result in blowout of the flame. Moreover, the flame will not return to the combustor because the exit velocity of the fuel gas/oxidant mixture is greater than the flame speed. The absence of the flame in the burner can be detected using the flame sensor (e.g., a flame rod or UV sensor), generally depicted as 46, which can be used as an indication that the flameless mode has begun. The increased flow of oxidant and fuel can cool the nozzle assembly 24, and help prevent reignition of the flame in the burner 10 once the flameless mode is reached.

Thus, during the flameless mode, the fuel gas and oxidant are passed out of the burner 10 without undergoing combustion. Upon entering the high temperature furnace/radiant tube environment, the fuel gas is raised to a temperature sufficient to activate combustion. Thus, the location of the onset of combustion is moved from the burner combustor 26 downstream to the furnace chamber/radiant tube 16. Due to the relatively disperse combustion zone outside of the burner 10 and the entrainment of the flue gas within the fuel/oxidant mixture, there is not a substantial localized temperature spike. NOx production is thereby substantially reduced. As will be appreciated, once the flameless combustion mode has been initiated, the flows of fuel gas and oxidant may thereafter be cycled on and off, or otherwise maintained, decreased, or increased, to adjust the temperature within the furnace/radiant tube as desired.

It will be appreciated that the threshold value of fuel gas/oxidant mixture flow rate at which blowout of the flame will occur may be a characteristic of the design of the burner and may be determined experimentally. The increased flow rate of the combustible mixture can cause 1) a decrease in the residence time for combustion within the burner combustor; 2) an increase in strain rate in the burner combustor; 3) an increase of cooling effects on the burner combustor; and 4) an increased exit velocity through the burner combustor outlet, which promotes recirculation of flue gases and prevents the flame from stabilizing near the exit of the nozzle and propagating back into the combustor chamber 26. Combustion occurs at finite rates and, therefore, requires a certain residence time to finish. The decrease of residence time and increase of strain rate in the burner combustor may extinguish combustion within the burner combustor 26. The increased cooling effects help prevent the burner combustor 26 and nozzle from acting as an ignition source. The increased exit velocity can help create conditions of liftoff and blowout of a visible flame, as well as enhanced entrainment of the flue gas. Thus, available fuel gas and oxidant can be delivered into the furnace/radiant tube 16 prior to combustion. Due to the elevated temperature in the furnace/radiant tube 16, the fuel gas undergoes combustion downstream from the burner combustor 26. While the temperature levels within the furnace/radiant tube 16 are sufficient to cause combustion of the fuel gas, these temperature levels nonetheless are low enough to avoid substantial NOx generation. Moreover, the high exit velocity of the oxidant and fuel provides substantial blending and recirculation of the furnace/radiant tube atmosphere with the oxidant/fuel mix, resulting in reduced combustion temperatures in the furnace/radiant tube 16. As noted above, after flame extinction and the initiation of flameless combustion, the flow rate of the mixture can be maintained, decreased, or increased according to the process needs. In many cases, flameless combustion will remain even after the flow rate of the mixture is returned to the lower level used during the startup period.

Figure 7:
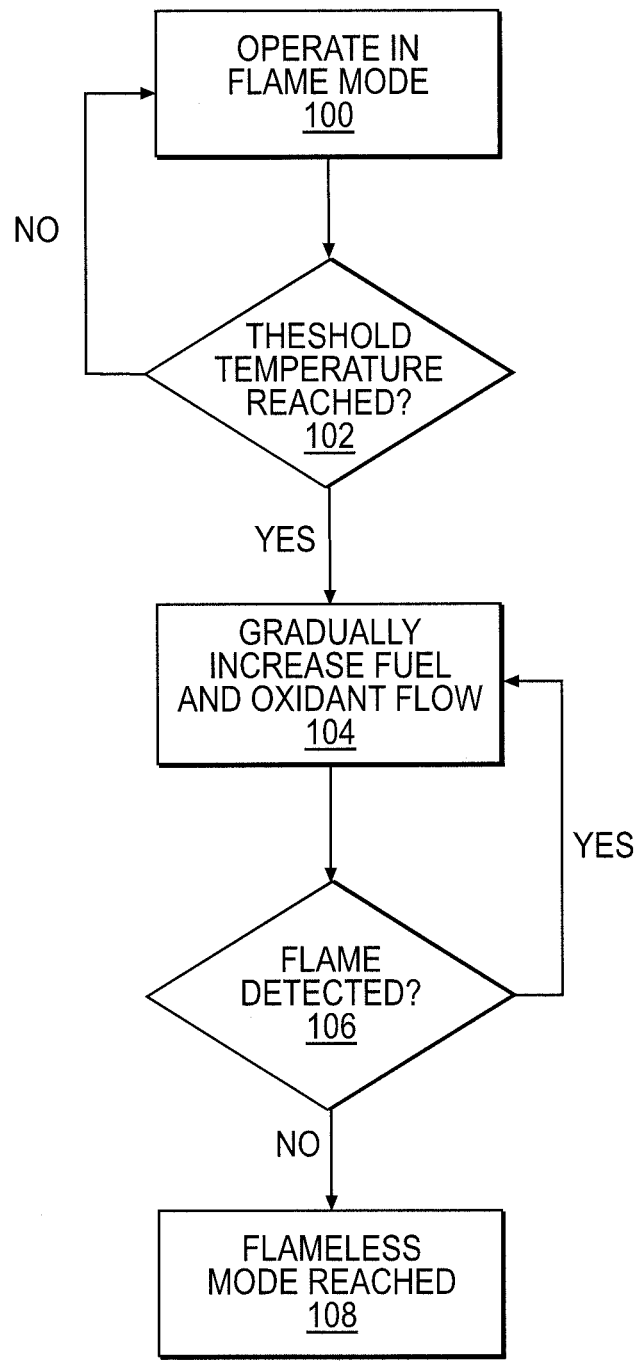
FIG. 7 is a diagram showing the method of controlling the burner from the flame mode to the flameless mode.

FIG. 7 shows an embodiment of a method of controlling the burner to move from the flame mode to the flameless mode. As described above, the fuel gas and oxidant mixture in the burner combustor can be ignited to create a flame in this region. At step 100, the burner can continue to operate in the flame mode until a threshold temperature has been reached in the furnace/radiant tube. The threshold temperature is a temperature at or greater than the auto-combustion temperature for the fuel gas and oxidant mixture. At step 102, the temperature in the furnace/radiant tube is measured and compared to the threshold temperature. If the threshold temperature has not been reached, then the burner continues to operate in the flame mode until another temperature measurement is taken and compared. If the threshold temperature has been reached or exceeded, then as represented in step 104, the flow of fuel gas and oxidant are gradually increased to move the flame away from the nozzle assembly and out of the burner. As shown in step 106, a flame detection sensor can be monitored to detect whether the flame is still present in the burner combustor. As long as the flame is detected, the fuel gas and oxidant flow can continue to be increased. When the flame is no longer detected, then the flameless mode has been reached in step 108, and combustion is only occurring outside the burner in the furnace/radiant tube.

Figure 8:
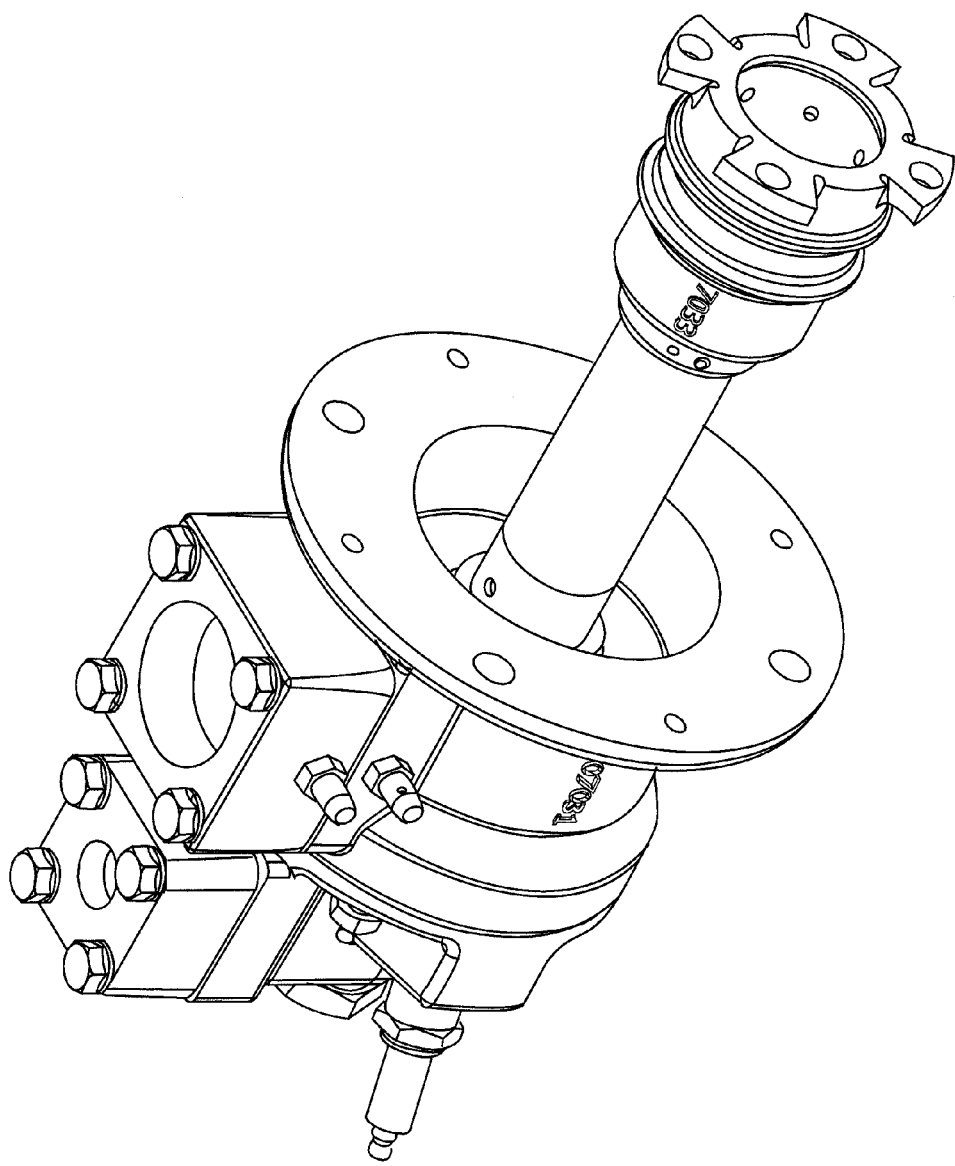
FIGS. 8-10 show another embodiment of a burner suitable for use with a control system and method as described herein.
Figure 10:
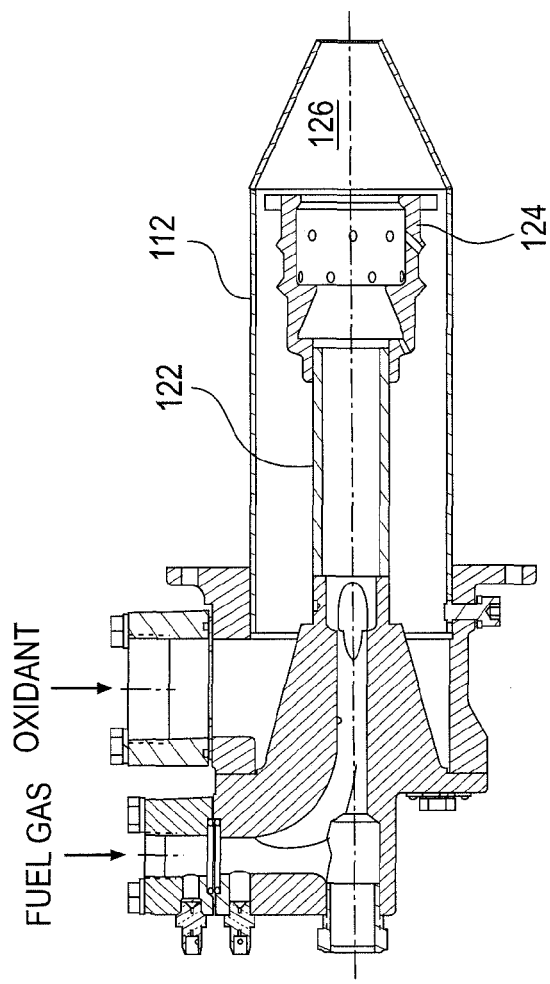
Figure 9:
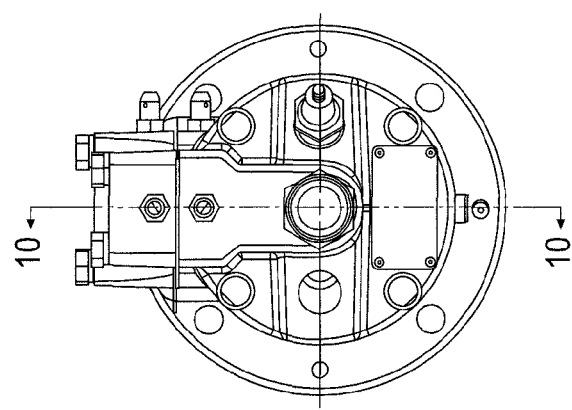

FIGS. 8-10 show another embodiment of a burner suitable for use with the control system and method described above. As shown, the burner can include an alternative suitable nozzle geometry for use with the control system and method described above. For example, the burner can include a cover tube 112, fuel tube 122, nozzle assembly 124, and burner combustion chamber 126.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of operating a burner to reduce NOx emissions comprising:
   providing a burner including a fuel control valve, an oxidant control valve, a combustion chamber, a fuel supply pathway surrounded by an air shroud, a hollow heat recuperator having a convoluted surface, a nozzle disposed in the combustion chamber, wherein the nozzle comprises a sleeve that is secured about a distal end of fuel supply pathway, and an oxidant supply pathway connected to the nozzle and disposed between an outer wall of the air shroud and an interior of the heat recuperator;
   supplying the burner with fuel and oxidant such that the fuel and oxidant flow through the nozzle and intermix in the combustion chamber;
   controlling the fuel control valve and the oxidant control valve in order to provide the flow of fuel and oxidant to the combustion chamber in an amount that maintains a stable flame in the combustion chamber;
   igniting the fuel and oxidant mixture in the combustion chamber;
   heating a space of a furnace that is exterior to the combustion chamber, and into which the combustion chamber does not extend, to a temperature at or above an auto-ignition temperature of a mixture of the fuel and oxidant; and
   adjusting at least one of the fuel control valve and the oxidant control valve to increase at least one of the flow of fuel and oxidant into the combustion chamber to destabilize and extinguish the flame in the combustion chamber such that combustion occurs in the space of the furnace that is exterior to the combustion chamber and into which the combustion chamber does not extend in the absence of a flame in the combustion chamber.

2. The method of claim 1 further comprising adjusting at least one of the fuel control valve and the oxidant control valve to decrease at least one of the flow of fuel and oxidant into the combustion chamber after the flame has been extinguished in the combustion chamber.

3. The method of claim 1 further comprising monitoring the status of the flame in the combustion chamber using a flame sensor.

4. The method of claim 1 wherein the space of the furnace that is exterior to the combustion chamber and into which the combustion chamber does not extend includes a furnace chamber in the furnace.

5. The method of claim 1 wherein the space of the furnace that is exterior to the combustion chamber and into which the combustion chamber does not extend includes a radiant tube.

6. The method of claim 5 wherein the radiant tube is disposed in a furnace chamber in the furnace.

7. The method of claim 1 wherein a controller automatically adjusts at least one of the fuel control valve and the oxidant control valve to increase at least one of the flow of fuel and oxidant into the combustion chamber to destabilize and extinguish the flame in the combustion chamber when the temperature in the space of the furnace that is exterior to the combustion chamber and into which the combustion chamber does not extend reaches a pre-determined temperature at or above the auto-ignition temperature of the fuel and oxidant mixture.

8. The method of claim 7 wherein a temperature sensor is disposed in the space of the furnace that is exterior to the combustion chamber and into which the combustion chamber does not extend, and wherein the temperature sensor is monitored by the controller.

9. The method of claim 7 wherein the controller automatically adjusts at least one of the fuel control valve and the oxidant control valve to decrease the flow of at least one of the fuel and oxidant into the combustion chamber after the flame has been extinguished in the combustion chamber.

10. The method of claim 1 wherein after the flame has been extinguished in the combustion chamber, the flow of fuel and oxidant in the combustion chamber is maintained for a sufficient amount of time to cool the nozzle to a desired temperature.

11. A burner for reducing NOx emissions comprising:
   a combustion chamber;
   a fuel supply pathway surrounded by an air shroud;
   a nozzle disposed in the combustion chamber, wherein the nozzle comprises a sleeve that is secured about a distal end of the fuel supply pathway;
   a fuel control valve disposed in the fuel supply pathway;
   a hollow heat recuperator having a convoluted surface;
   an oxidant supply pathway connected to the nozzle and disposed between an outer wall of the air shroud and an interior of the heat recuperator;
   an oxidant control valve disposed in the oxidant supply pathway; and
   a controller connected to the fuel control valve and the oxidant control valve, wherein the controller monitors a temperature in a space of a furnace that is external to the combustion chamber, and into which the combustion chamber does not extend, in order to adjust at least one of the fuel control valve and the oxidant control valve to increase at least one of the flow of fuel and oxidant into the combustion chamber to destabilize and extinguish a flame in the combustion chamber when the temperature in the space of the furnace that is exterior to the combustion chamber and into which the combustion chamber does not extend reaches a pre-determined temperature at or above an auto-ignition temperature of a mixture of the fuel and oxidant.

12. The burner of claim 11 further comprising an igniter disposed in the combustion chamber for igniting the fuel and oxidant mixture in the combustion chamber.

13. The burner of claim 12 wherein the controller activates the igniter.

14. The burner of claim 11 further comprising a flame sensor disposed in the burner for detecting the presence of a flame in the combustion chamber.

15. The burner of claim 14 wherein the controller monitors the flame sensor for detecting the presence of a flame in the combustion chamber.

16. The burner of claim 11 wherein the nozzle includes a plurality of openings for fuel and oxidant to pass through and intermix in the combustion chamber.

17. The burner of claim 11 wherein the controller automatically adjusts the fuel control valve and oxidant control valve.

18. The burner of claim 11 wherein the burner is connected to the furnace.

19. The burner of claim 11 wherein the burner is connected to a radiant tube.

* * * * *